No. 820,685. PATENTED MAY 15, 1906.
C. H. TERRY.
REEL CLAMP FOR FISHING RODS.
APPLICATION FILED JULY 29, 1905.
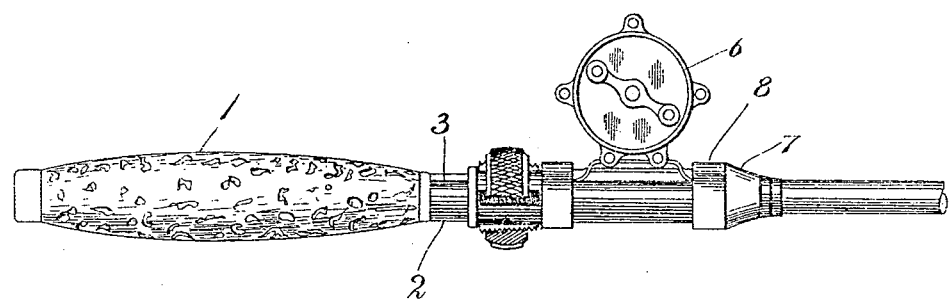
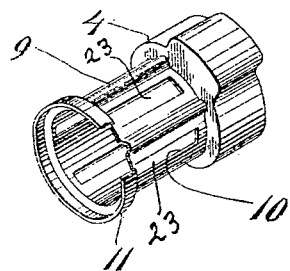
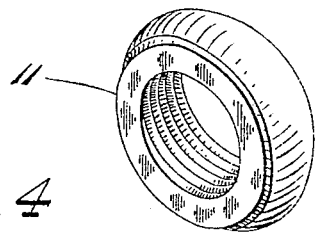
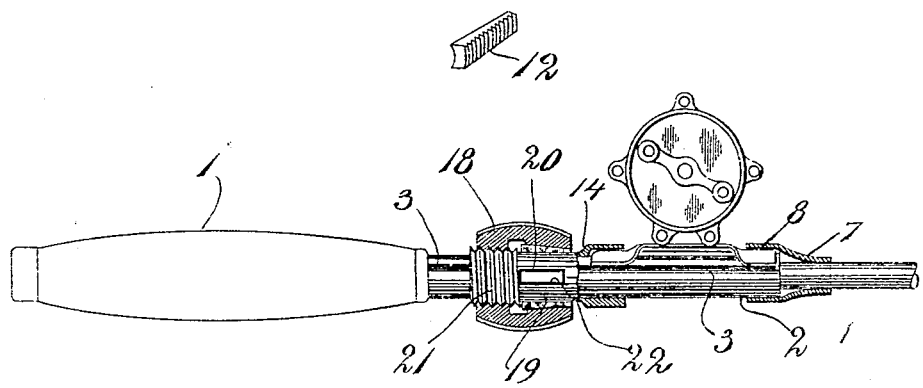
Witnesses
F. W. Wright
Wm. G. Bergman
Inventor
Charles H. Terry
By his Attorney

UNITED STATES PATENT OFFICE.

CHARLES H. TERRY, OF BRISTOL, CONNECTICUT.

REEL-CLAMP FOR FISHING-RODS.

No. 820,685.   Specification of Letters Patent.   Patented May 15, 1906.

Application filed July 29, 1905. Serial No. 271,735.

*To all whom it may concern:*

Be it known that I, CHARLES H. TERRY, a citizen of the United States, residing at Bristol, Connecticut, have invented certain new and useful Improvements in Reel-Clamps for Fishing-Rods, of which the following is a clear, full, and exact description.

This invention relates to an improved means for clamping the slidable member of a reel-holding receptacle upon the butt of a fishing rod or pole.

The object of this invention is to provide a simple, cheap, readily-operated, and reliable reel-clamp for securing the movable member of the reel-receptacle in place upon the fishpole rod or butt.

In carrying out my invention I generally make use of the usual stationary collar member having a recess upon one portion of its periphery into which one of the ends of a reel-base may fit, and I provide the slidable member of the reel-holding means, which I will hereinafter refer to as the "collar," with means for clamping it in any longitudinal desired position upon the butt. I prefer to effect the clamping of the collar in position by the use of suitable wedges, and in my preferred construction illustrated herein I have shown these wedges as being screw-threaded, a threaded hand-nut being adapted for compressing the wedges upon the butt itself. I find that a simple and serviceable type of clamp may be produced by providing the collar with an extending tubular portion perforated with suitable openings, preferably rectangular ones, into which rectangular wedges may be fitted and limited in their motion by the edges of the rectangular holes formed in the tubular portion of the collar. By pressing a clamping-nut against these wedges they may be caused to grip the rod, and as the collar and the wedges are limited in movement together the collar will be held stationary. In my preferred construction these wedges are shown as having a screw-thread formed on their outer faces for coöperation with the thread of the adjacent clamping-nut. This may not be essential, however, and as shown in a modified construction these wedges may be plain and the extending tubular part of the collar be provided with screw-threads to be gripped by threads of an adjusting-nut, which in this case might well be provided with inclined faces for coöperation with the wedges.

I realize that the construction shown and illustrated herein may be varied to quite an extent without departing from the spirit or scope of my invention as set forth in the claims.

In the accompanying drawings, Figure 1 is a side elevation of a fishpole-butt provided with my invention, the thumb-nut being shown partly broken away. Fig. 2 is a perspective view of the collar which contains the wedges. Fig. 3 is a perspective view of the thumb-nut. Fig. 4 is a perspective view of one of the wedges; and Fig. 5 is a view similar to Fig. 1 of a modification, the adjusting-nut and the reel-holding members being shown in section.

Referring first to Figs. 1 to 4, inclusive, my improved fishpole-butt is provided with a stationary handle 1, secured on the rod or butt proper, 2, which is provided with longitudinal ribs 3 for guidance of the collar 4, to be hereinafter described, and also to aid in the positioning of the ends of the reel 6 in a manner well known in the art. The pole may be provided with the usual stationary member or collar 7, having a recess 8 for the reception of one of the ends of the reel, while a second member or collar 4 is longitudinally movable upon the butt 2 between the handle part and the stationary collar. This collar 4 may be prevented from rotating on the rod by grooving it at 23, as shown in Fig. 2, to fit the longitudinal guides 3 formed on the butt. I prefer to provide the collar 4 with an extending tubular part or barrel 9, pierced at suitable distances around its periphery by rectangular openings 10. A thumb-nut or collar 11 may be inserted over the barrel 10, while the extreme end of the barrel may be upset or provided with a flange 11. In the grooves 10 I locate wedges 12. As shown in Fig. 4, these wedges are formed with interrupted screw-threads across their outer face, and they may be curved upon their inner face to fit the curve of the rod, if desired.

In use the reel 6 is first inserted in position with one end in the recess 8 of the stationary collar, and the slidable collar 4 is then forced up over the other end to grasp it firmly. The thumb-nut is then rotated to mount the incline of the wedges 12 to force them tightly against the butt 2 to prevent their motion upon the butt. The collar is now locked in position because of the fit of the wedges in the rectangular openings 10, and the entire device is thus locked in position.

In the modification shown in Fig. 5 I have shown the pole to be provided with a handle 1, a stationary collar 7 mounted on the butt 2, which is provided with guides 3 of the same construction as that first described, while the collar 14 is shown as provided with a barrel 19, having rectangular openings 20 and provided with a threaded portion 21 instead of the flanged or upset end heretofore described. In this case the wedges 22 need not be threaded, but the thumb-nut 18 will be provided with a threaded annular opening at one end and a wedge-like annular opening at its other end, preferably with an enlarged annular opening between them, so that upon rotating the threaded nut upon the threaded end of the collar the wedge-like annular surface of the nut will force the wedges 22 into intimate contact with the butt 2 to cause them and also the collar to be tightly clamped in position. Its use will obviously be the same as that described in the description of my preferred construction.

I claim as my invention—

1. A fishpole-butt having a fixed handle and a slidable collar for the reception of the reel, and clamping means for securing the collar directly on the butt including a rotatable nut whereby the collar may first be forced onto the reel, and the collar then secured to the butt independent of said reel.

2. A fishpole-butt having a slidable collar for the reception of the reel, one or more wedges carried by said collar and means for clamping said wedges on the butt to lock the collar thereto.

3. A fishpole-butt having a slidable collar for the reception of the reel, one or more wedges carried by said collar, and a screw-threaded means for clamping said wedges on the butt to lock the collar thereto.

4. A fishpole-butt having a slidable collar for the reception of the reel, one or more screw-threaded wedges carried by the collar and means for clamping said wedges on the butt to lock the collar thereto.

5. A fishpole-butt having a slidable collar for the reception of the reel, one or more perforations through the body of the collar and a wedge in each perforation in combination with a threaded hand-nut for clamping the wedges upon the butt to lock the collar thereto.

6. A fishpole-butt having a slidable collar for the reception of the reel, one or more perforations through the body of the collar and a screw-threaded wedge in each perforation in combination with a threaded hand-nut for clamping the wedges upon the butt to lock the collar thereto.

7. The combination of a rod, a socket element slidable thereon, a clamping-jaw upon said element, and means upon said element for forcing said jaw into frictional engagement with said rod.

Signed at New York city this 24th day of May, 1905.

CHARLES H. TERRY.

Witnesses:
F. WARREN WRIGHT,
EMERSON R. NEWELL.